US012629693B2

(12) United States Patent
Orhan et al.

(10) Patent No.: US 12,629,693 B2
(45) Date of Patent: May 19, 2026

(54) DEVICE MODULE FOR A LABORATORY DEVICE AND METHOD FOR TEMPERATURE-CONTROL OF A LABORATORY DEVICE

(71) Applicant: Retsch GmbH, Haan (DE)

(72) Inventors: Zilan Orhan, Witten (DE); Uwe Orth, Monschau (DE)

(73) Assignee: Retsch GmbH, Haan (DE)

( * ) Notice: Subject to any disclaimer, the term of this patent is extended or adjusted under 35 U.S.C. 154(b) by 272 days.

(21) Appl. No.: 17/797,563

(22) PCT Filed: Feb. 3, 2021

(86) PCT No.: PCT/EP2021/052504
§ 371 (c)(1),
(2) Date: Aug. 4, 2022

(87) PCT Pub. No.: WO2021/156285
PCT Pub. Date: Aug. 12, 2021

(65) Prior Publication Data
US 2023/0065817 A1     Mar. 2, 2023

(30) Foreign Application Priority Data

Feb. 7, 2020     (DE) ..................... 10 2020 103 160.2
Jul. 23, 2020     (DE) ..................... 10 2020 119 489.7

(51) Int. Cl.
*B02C 17/18*          (2006.01)
*B02C 17/00*          (2006.01)
*G05D 23/19*          (2006.01)
(52) U.S. Cl.
CPC ........ *B02C 17/1815* (2013.01); *B02C 17/002* (2013.01); *B02C 17/183* (2013.01); *G05D 23/19* (2013.01); *G05D 23/1902* (2013.01)

(58) Field of Classification Search
CPC ......................... B02C 17/1815; B02C 17/002
See application file for complete search history.

(56) References Cited

U.S. PATENT DOCUMENTS

| | | | | | |
|---|---|---|---|---|---|
| 4,129,443 A | * | 12/1978 | Kaufman | .................. | B22F 9/04 |
| | | | | | 427/217 |
| 6,196,480 B1 | * | 3/2001 | Fukuda | ................... | B02C 23/32 |
| | | | | | 241/23 |

(Continued)

FOREIGN PATENT DOCUMENTS

| | | | | |
|---|---|---|---|---|
| CN | 201500574 U | * | 6/2010 | |
| DE | 2918834 A1 | * | 11/1980 | |

(Continued)

OTHER PUBLICATIONS

International Search Report and Written Opinion in PCT/EP2021/052504, dated May 7, 2021, 10 pages.

*Primary Examiner* — Nathan L Laughlin
(74) *Attorney, Agent, or Firm* — Andrus Intellectual Property Law, LLP

(57)          ABSTRACT

A device module for a laboratory device is shown and described. The device module has at least one temperature control medium connection for connecting the device module, as required, to a temperature control medium supply of, in particular, a liquid or gaseous temperature control medium, at least one line connection for connecting, as required, to at least one supply line of the laboratory device for the temperature control medium, and at least one actuator of a control process and/or control loop for controlling and/or regulating at least one temperature in the laboratory device.

17 Claims, 8 Drawing Sheets

(56)                    References Cited

U.S. PATENT DOCUMENTS

| | | | | |
|---|---|---|---|---|
| 9,943,854 B1 * | 4/2018 | Melnyk | .................. | B02C 19/186 |
| 2003/0014150 A1 * | 1/2003 | Flanagan | ........... | B23Q 3/15546 |
| | | | | 700/175 |
| 2007/0166833 A1 * | 7/2007 | Rajendram | .............. | G01N 1/06 |
| | | | | 436/174 |
| 2014/0202678 A1 * | 7/2014 | Goth | .................. | H05K 7/20763 |
| | | | | 165/200 |
| 2017/0335079 A1 * | 11/2017 | Polus | ........................ | C08J 5/243 |
| 2018/0250682 A1 * | 9/2018 | Palmer | ................... | B02C 17/10 |
| 2018/0313755 A1 * | 11/2018 | Hatch | .................... | G01N 21/85 |
| 2022/0095482 A1 * | 3/2022 | Helberg | .................. | G06F 1/206 |

FOREIGN PATENT DOCUMENTS

| | | | |
|---|---|---|---|
| EP | 2391454 | B1 | 6/2019 |
| JP | 2004305981 | A * | 11/2004 |
| WO | 2004008109 | A1 | 1/2004 |
| WO | 2010086132 | A1 | 8/2010 |
| WO | 2021043854 | A1 | 3/2021 |

* cited by examiner

DEVICE MODULE FOR A LABORATORY DEVICE AND METHOD FOR TEMPERATURE-CONTROL OF A LABORATORY DEVICE

CROSS-REFERENCE TO RELATED APPLICATIONS

The present application is the U.S. national stage application of international application PCT/EP2021/052504 filed Feb. 3, 2021, which international application was published on Aug. 12, 2021, as International Publication WO 2021/156285 A1. The international application claims priority to German Patent Application No. 10 2020 103 160.2, filed Feb. 7, 2020, and to German Patent Application No. 10 2020 119 489.7 filed Jul. 23, 2020. The international application and German applications are hereby incorporated by reference herein in their entireties.

BACKGROUND

The invention relates to a device module for a laboratory device, in particular for a comminution device for material comminution, further in particular for a laboratory mill, such as a ball mill, and/or for a feeding device for feeding, dosing and/or conveying sample materials and/or for feeding comminution device, such as laboratory mills, sample dividers or particle measuring devices. Furthermore, the present invention relates to a method for temperature control, in particular cooling, of a laboratory device, in particular during operation of the laboratory device, further in particular for temperature control of a laboratory mill, such as a ball mill, and/or for temperature control of a feed device, the feed device being designed for feeding, metering and/or conveying sample materials and/or for feeding comminution device, such as laboratory mills, sample dividers or particle measuring device, in particular using a device module of the type mentioned at the beginning.

In vibrating mills for laboratory use, it is known to cause additional brittleness of the material to be comminuted by cooling with liquid nitrogen for efficient comminution of brittle materials in particular. In known processes, cooling is achieved, for example, by immersing the grinding bowl in liquid nitrogen, with which a grinding bowl holder is flooded. For this purpose, the liquid nitrogen must be continuously fed to and away from the grinding bowl holder. In this context, it is known to supply the liquid or gaseous medium, for example nitrogen, by means of appropriately arranged flexible hoses. In this case, the hoses are attached directly to the grinding bowl holder, whereby there is then a fluidic connection between the grinding bowl holder and the grinding bowl used.

In addition to the nitrogen application, other applications use the short-term local release of larger amounts of energy during the grinding process to initiate chemical reactions. Depending on the reactions that occur, the grinding bowl may need to be cooled or heated. This also requires its continuous supply with a medium to temper the reaction chamber.

EP 2 391 454 B1 describes a laboratory mill with rotary feedthroughs for the grinding bowls to be supplied with a medium. Here, it is provided that two temperature control lines for the supply and discharge of the medium are connected to each grinding bowl and both temperature control lines are led via the rotary union, whereby two external connections for the stationary temperature control lines of the laboratory mill are formed on the stationary part of the rotary union and two internal connections for the temperature control lines leading to the grinding bowl are formed on the movable part of the rotary union.

According to the laboratory mill known from EP 2 391 454 B1, liquid nitrogen is fed into the rotating union via a nitrogen line and a switching valve as well as via a connection and leaves the rotating union via a supply line connected to the connection. The nitrogen flow is then directed to the grinding bowl holder and from there back to the moving part of the rotating union and finally enters a collecting vessel via the stationary part of the rotating union and a return line connected to it. As soon as a sensor located on the collecting vessel comes into contact with liquid nitrogen, the switching valve is closed. After so much nitrogen has evaporated that the sensor is no longer wetted with nitrogen, the switching valve is opened again. This ensures the supply of liquid nitrogen at all times during a grinding process.

For cooling the known laboratory mill, the grinding bowl holder is flooded with nitrogen and the grinding bowl inside is flushed with liquid nitrogen. Consequently, there is direct contact between the tempering medium and the grinding bowl. In addition, the grinding bowl is always cooled to the maximum by the flooding in liquid nitrogen.

It is an object of the present invention to provide a device module for a laboratory device and a method for temperature control, in particular cooling, of a laboratory device, which enable a demand-dependent temperature control, in particular cooling, of laboratory devices in a constructively simple manner with a high degree of user-friendliness. The temperature control is to be carried out in such a way that the thermal energy dissipated during cooling of a component of the laboratory device and/or of a material sample treated in the laboratory device and/or the thermal energy supplied during heating of the component and/or of the material sample is adapted to the actual demand to the greatest possible extent.

SUMMARY

The aforementioned objects are solved by a device module and method having the features of the independent claims. Advantageous embodiments of the invention are subject of the subclaims.

According to the invention, a device module for a laboratory device is proposed which has at least one temperature control medium connection for connecting the device module as required to a temperature control medium supply of a temperature control medium, in particular a liquid temperature control medium, in particular for connection to a nitrogen tank or a nitrogen line, at least one line connection for connecting the device module as required to a supply line of the laboratory device for the temperature control medium, and at least one actuator of a control and/or regulating circuit for controlling and/or regulating at least one temperature in the laboratory device.

The device module makes it possible to supply a laboratory device with an in particular liquid temperature control medium, further in particular liquid nitrogen, from the temperature control medium supply via the temperature control medium connection, at least one supply line of the device module and the at least one line connection for the temperature control of the laboratory device. With the actuator as part of a control and/or regulating circuit, it is preferably possible to change the volume flow of the temperature control medium supplied to the laboratory device via the device module, wherein, for example, a higher volume flow of a coolant leads to greater cooling in the laboratory device and thus to a lowering of at least one temperature measured in the laboratory device. The measured temperature of the laboratory device is taken into account accordingly as an actual value in the temperature control and/or regulation.

A solenoid valve can be provided as the actuator. Preferably, the actuator can be designed for the clocked supply of the temperature control medium to the laboratory device. Alternatively or additionally, however, it is also possible for the actuator to be designed to change the temperature of the temperature control medium, which can be done, for example, by mixing at least two temperature control medium streams with different temperatures.

The device module is a replaceable, complex element and forms a separate functional unit which can be connected to the laboratory device as required and which supports or performs the functions of transporting the temperature control medium from the temperature control medium supply via the device module to the laboratory device and changing the temperature control medium volume flow and/or the temperature control medium temperature via the at least one actuator as part of a control and/or regulation process. The device module represents an integral structural unit. The device module according to the invention can be connected to the laboratory device as required, i.e. depending on the requirement to cool or heat the laboratory device, whereby the connection is made via the connections of the device module to the laboratory device on the one hand and the temperature control medium supply on the other hand. In this case, the device functions of the laboratory device can be called up or executed independently of the functions of the device module, whereby the device module can be physically connected to the laboratory device only when the laboratory device is to be tempered. In principle, however, it is also possible for the device module and the laboratory device to be permanently physically connected, in which case the temperature control functions of the device module, i.e. the forwarding of the temperature control medium to the laboratory device and/or changing the temperature control medium volume flow and/or the temperature control medium temperature, are only executed when temperature control of the laboratory device is required.

Due to the modular design of the device module with preferably standardized connections, it is possible to use the same device module for the temperature control of different laboratory devices and, for this purpose, to connect it to a laboratory device fluidically for the transport of the temperature control medium, mechanically for the formation of a physical connection and metrologically for the transmission of measured values from the laboratory device to the device module.

The device module according to the invention thus differs from laboratory devices which already have a fixed temperature control medium connection and an actuator integrated in the device housing. According to the invention, interfaces are provided in the line routing of the temperature control medium from the temperature control medium supply to the place of cooling or heating in the laboratory device, which allow the device module to be separated from the laboratory device as a structural unit in a non-destructive manner or as intended. In this way, the device module according to the invention can be used, if necessary, for a plurality of laboratory devices of the same or different design.

Preferably, the device module has a module housing that can be detachably connected to a housing of the laboratory device. A positive and/or non-positive connection can be provided between the module housing and the device housing.

Any power supply to the device module can be provided via an electrical supply line through the laboratory device. In principle, however, the device module can also have a separate power supply.

Particularly preferably, the device module has a control and/or regulating device for generating a control variable for the actuator. The control and/or regulating device can comprise an electronic circuit appropriately designed for this purpose. Preferably, a control device is provided which determines a control deviation between at least one measurement temperature in the laboratory device and a predetermined setpoint and then generates the control variable for the actuator on the basis of the control deviation. This enables precise and demand-dependent temperature control of the laboratory device as a function of the actual temperatures in the laboratory device in a simple manner. The logic of the control process or control loop is integrated into the device module, so that the device module can be used as needed for temperature control of different laboratory devices. Different control and/or regulation programs can be stored in the control and/or regulation device to enable temperature control and/or regulation for different laboratory devices.

For the transmission of measurement data, in particular for the transmission of temperature measurement data, between the laboratory device and the device module, the device module can have at least one communication or data interface. Preferably, a control device of the instrument module determines a control deviation between a measured temperature of the laboratory device and a temperature setpoint stored in the control device. In the case of a ball mill, for example, in particular in the case of a vibrating mill, it may be provided to measure the temperature of a grinding vessel and/or a grinding vessel holder and/or the temperature inside the grinding vessel or inside a grinding chamber of the ball mill, and to transmit this measured temperature value to the control device of the device module. Based on the measured value, the control deviation is then determined by the device module and, if necessary, the device module generates a control variable in order to adjust the actuator for changing the temperature control medium flow rate and/or the temperature control medium temperature accordingly, thereby eliminating or at least reducing the control deviation. Due to the local proximity of the temperature measurement to the grinding vessel and/or grinding chamber, a lower control inertia is achieved with a higher precision and speed of the control.

Alternatively or additionally, it is also possible to measure the temperature of the temperature control medium in at least one temperature control medium line of the cooling unit and/or the room or ambient temperature during temperature control and/or regulation and to take this temperature into account during control or regulation.

The device module can have at least one further line connection for connection to a discharge line of the laboratory device for the temperature control medium, whereby temperature control medium can be discharged from the laboratory device and the further line connection and at least one return line of the device module can be discharged into the environment and/or a collecting tank and/or returned to the temperature control medium supply. If liquid nitrogen is used as the temperature control medium, the return line of the equipment module can open into an expansion pipe in which the nitrogen is vaporized and released into the environment.

The device module can also have at least one measuring device for recording a measured value of the temperature control medium, in particular for temperature measurement. Several temperature sensors can be provided to enable error detection, in particular for detecting temperature control medium leaks occurring in the laboratory device. For example, if the laboratory device is a laboratory mill with multiple grinding vessels, each grinding vessel may be connected to a return line in the device module via a drain line and another connection of the device module. By measuring the temperature in several return lines of the tempering medium and comparing the measured temperatures, it is possible to conclude that there are leaks in the laboratory device if there is a greater deviation between the measured temperatures. In principle, it is also possible to measure the level and/or the volume flow of the temperature control medium in the device module using suitable sensors.

A structurally advantageous embodiment of the invention provides that the device module comprises a module housing and a functional part that can be detachably connected to the module housing, wherein the functional part serves as a support for the temperature control medium connection, the line connection and the actuator. A plurality of line connections may be provided, all of which are retained on the functional part. This allows the functional part to be separated or removed from the module housing as an independent functional unit and connected to another module housing and used together with the other module housing. Further components of the functional part, which are held on the functional part, can be at least one supply line and at least one return line for routing the temperature control medium between the connection points of the functional part. Several line sections can be held on the functional part and brought together or lead into a collector line.

The control and/or regulation device or the electronics of the control and/or regulation may preferably be held on the module housing. The module housing is preferably designed for a specific type of laboratory device, which may affect the geometry and the dimensioning of the module housing, so that it is expedient to assign the instrument intelligence of the instrument module or the electronics of the control process and/or the control loop to the module housing.

The housing shape of the module housing can be adapted to the housing shape of a housing of the laboratory device. Preferably, an adaptation of the housing is provided in such a way that the module housing, in the state of the device module connected to the laboratory device, is perceived as an integral part of the overall housing arrangement formed by the housing and the module. An adaptation may also be provided with regard to the dimensioning and/or external appearance of the module housing and a laboratory device connectable to the device module.

It is possible to structurally separate the functional part from the module housing or to remove the functional part from one module housing and install it in another module housing. A further aspect of the invention thus also relates to a system having at least one functional part and having a plurality of different module housings, wherein the module housings are adapted to the shape and/or dimensioning and/or external appearance or design of the device housings of different laboratory devices, and wherein the functional part can be connected, as required, to each module housing to form a device module according to the invention.

For example, at least one outer wall of the module housing and a housing wall of the device housing of the laboratory device may be aligned and/or project laterally relative to one another only slightly in at least one spatial direction, i.e. less than 5 cm, preferably less than 3 cm, particularly preferably less than 1 cm. The device housing of the laboratory device and the module housing may have substantially identical contour lines in a view from above and/or in a view from at least one side of the arrangement comprising laboratory device and device module.

A preferred embodiment in which the device module is perceived as an integral part of the laboratory device may provide that the laboratory device is placeable on the device module. Preferably, the laboratory device may be mountable on the device module via latching and/or retaining projections on the top surface of the instrument module to ensure that the laboratory device is mountable on the device module only in a particular orientation relative to the device module and that the laboratory device cannot be displaced in the horizontal direction relative to the device module. Further preferably, the laboratory device and the device module are not frictionally connected to each other in the connected state, i.e., in a state when the fluidic connections of the laboratory device and the device module are fluidically connected to conduct the temperature control medium. In particular, an additional screw connection between the laboratory device and the device module may be dispensable. In principle, however, a screw connection of the module housing to the device housing is not excluded.

The functional part can be inserted and/or pushed into the module housing of the device module, preferably horizontally and preferably from behind on a rear side of the device module. The rear side of the device module corresponds to the rear side of the laboratory device in the connected state of the device module and laboratory device.

A condensate drain from the laboratory device can be provided via the device module. A condensate collector can be provided on the underside of the device module. Condensate can be drained downwards from above through the functional part. For this purpose, the device module can have a perforated drainage surface for condensate water from the laboratory device, which in particular can be a component of the functional part. A condensate collector, preferably in the form of a pull-out drawer, can be provided below the functional part for condensate from the laboratory devices that drips through the draining surface and the functional part. This makes it possible to collect and drain condensate in a simple manner.

The method according to the invention for temperature control, in particular cooling, of a laboratory device, further in particular of a ball mill, such as a vibrating mill, provides for the first time in the state of the art for temperature control of the laboratory device in a closed control loop, in particular using a device module according to the invention, wherein at least one temperature is measured in the laboratory device and the measured temperature value is transmitted as a controlled variable or as an actual value to a control device, in particular a control device of a device module according to the invention. The control device then determines a setpoint-actual value deviation or control deviation, which is the input variable of a process controller that calculates a control variable for an actuator. In the case of the device module according to the invention described above, a solenoid valve can be provided as the actuator, for example, in order to change the volume flow of the temperature control medium, preferably in a clocked manner, as a function of the control deviation. Alternatively, it is also possible to change the temperature of the temperature control medium as a function of the control deviation, for example by mixing temperature control medium flows of different temperatures with one another. Temperature control is possible, for example, by means of a PID controller.

For example, if the temperature of a laboratory mill is to be monitored and controlled, in particular a laboratory ball mill such as a laboratory vibrating mill, a temperature measurement may be provided on a grinding bowl support and/or on a grinding bowl of the mill and/or a temperature measurement may be provided in the grinding chamber of the grinding bowl. At least one temperature sensor may be located in close proximity to the grinding vessel to enable temperature monitoring of the grinding vessel. If a temperature sensor is placed in the grinding chamber, temperature monitoring of the grinding sample can be realized. The control by the local proximity of the temperature sensors to the grinding vessel and/or to the grinding sample leads to a lower control inertia during the control, so that the precision and speed of the control are high.

If the temperatures of several grinding bowls and/or grinding samples are to be controlled independently of each other, this is possible by means of several temperature sensors on and/or in the grinding bowls, whereby the temperature measured values are transmitted to the equipment module. The control of the temperatures in and/or on the grinding bowls can be carried out independently of each other.

BRIEF DESCRIPTION OF THE DRAWINGS

The drawings show examples of embodiments of the invention, which are described below.

DETAILED DESCRIPTION

Figure 1:
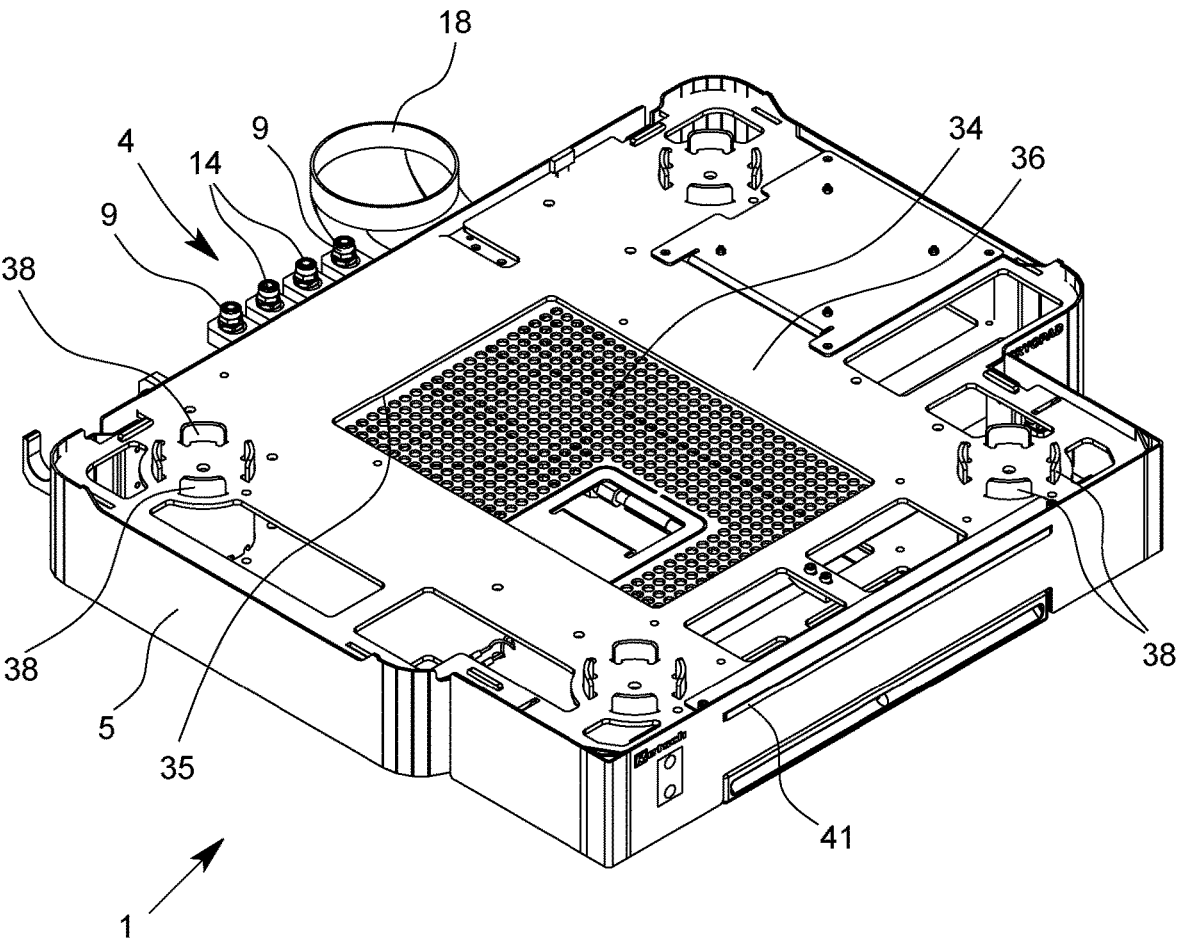
FIG. 1 is a perspective view of a device module according to the invention in an oblique view from the front.
Figure 2:
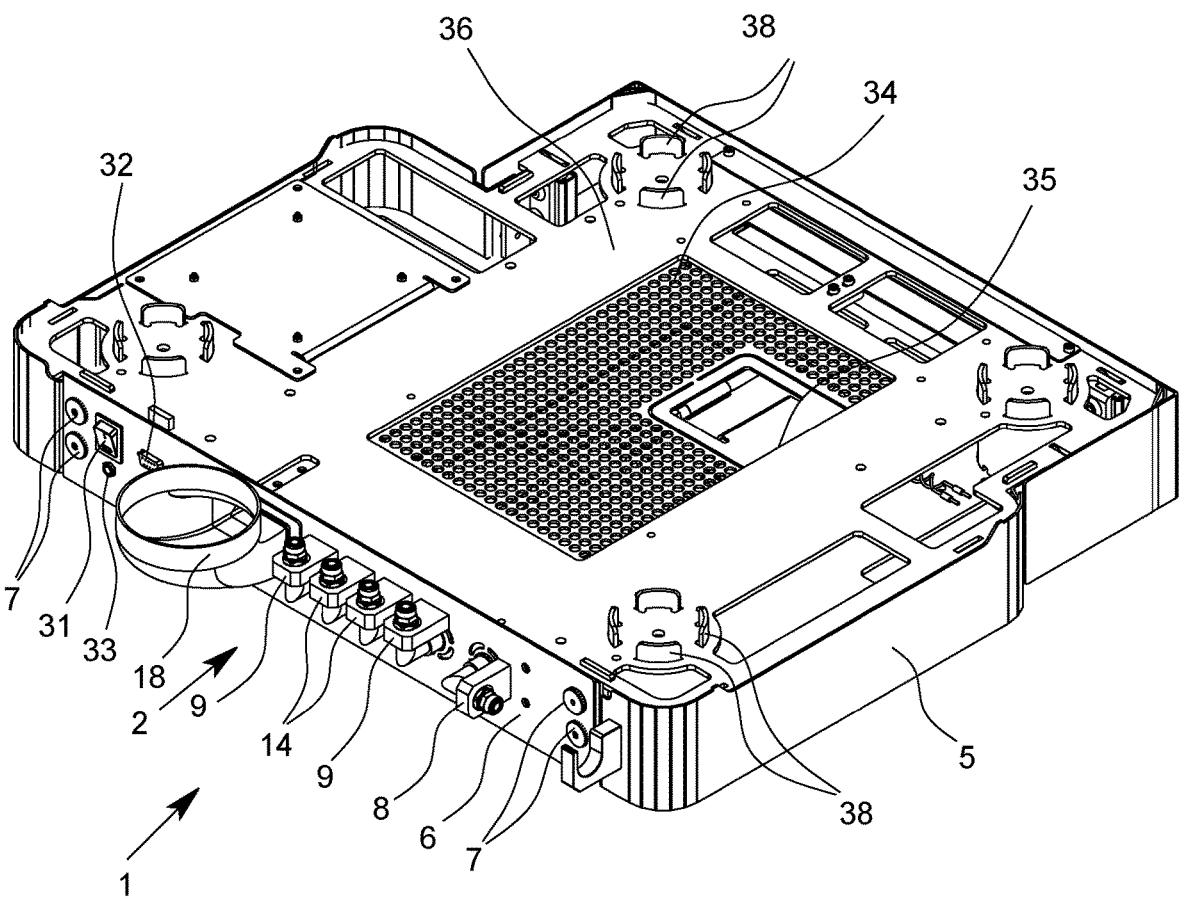
FIG. 2 is a perspective view of the device module from FIG. 1 in an oblique view from the rear.
Figure 3:
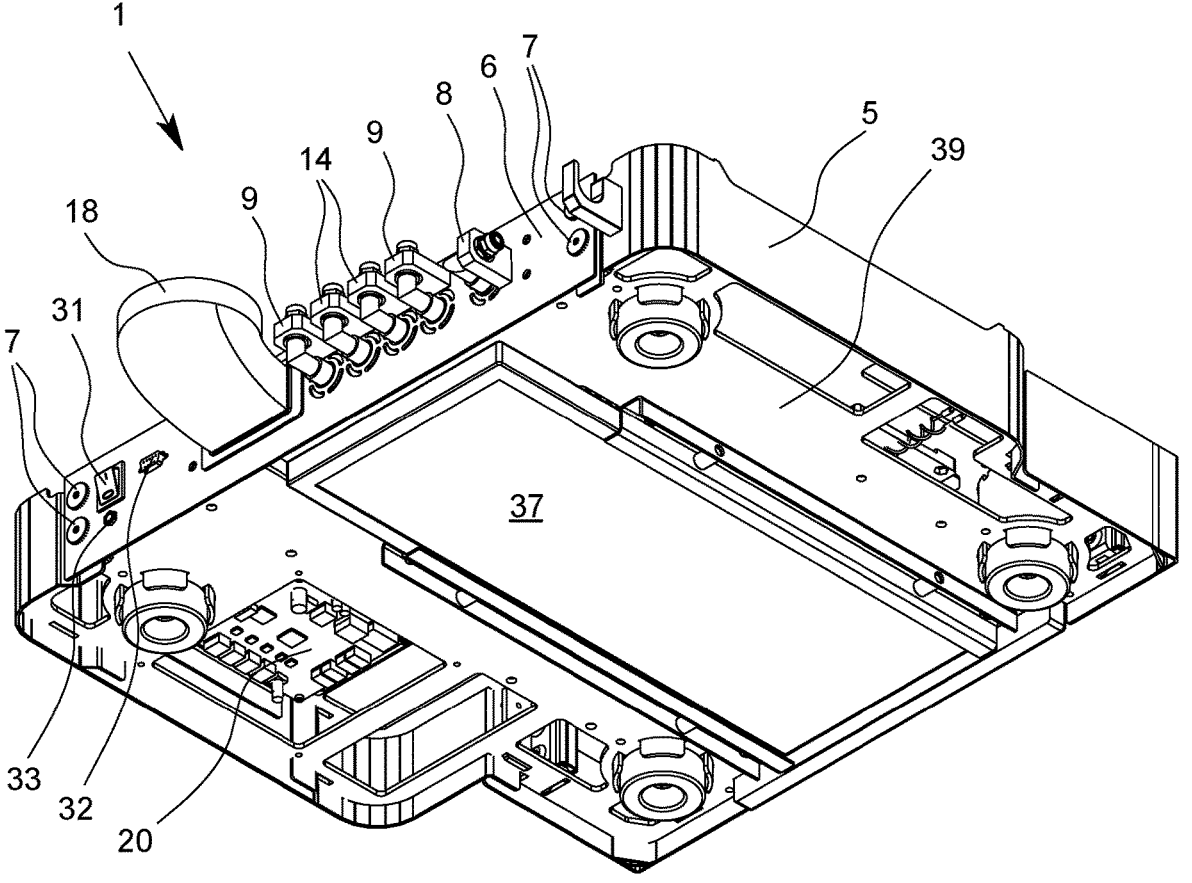
FIG. 3 is a perspective view of the device module shown in FIGS. 1 and 2 from below.

FIGS. 1 to 3 show a perspective view of a device module 1 for a laboratory device 2, whereby the laboratory device 2 can be a laboratory mill, in particular a laboratory vibrating mill. In principle, however, a design of the device module 1 adapted to other laboratory devices is also possible without further ado. The design of the device module 1 as a laboratory mill is therefore to be understood in the following as purely exemplary.

Figure 4:
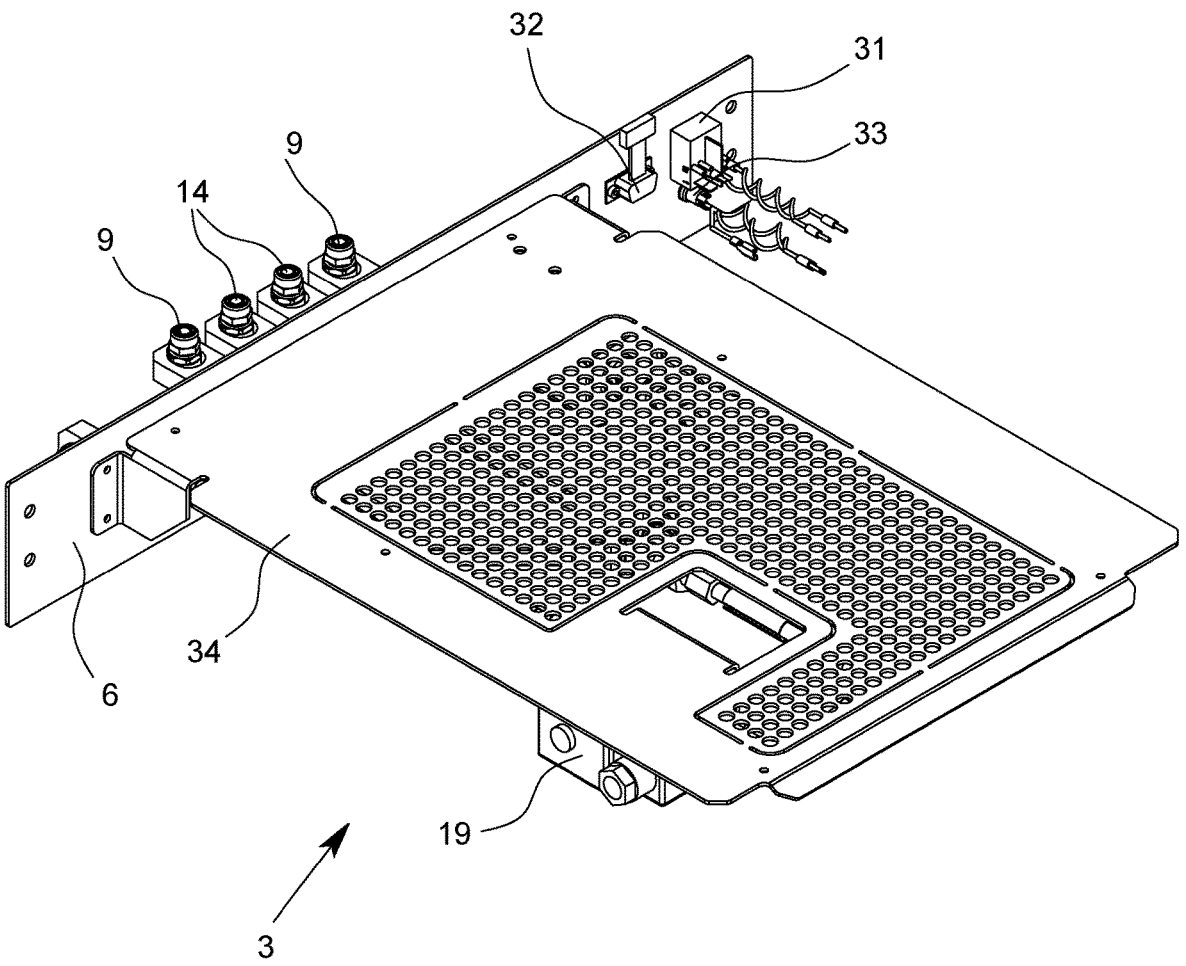
FIG. 4 is a perspective view of a functional part of the device module shown in FIGS. 1 to 3 in an oblique view from above.
Figure 5:
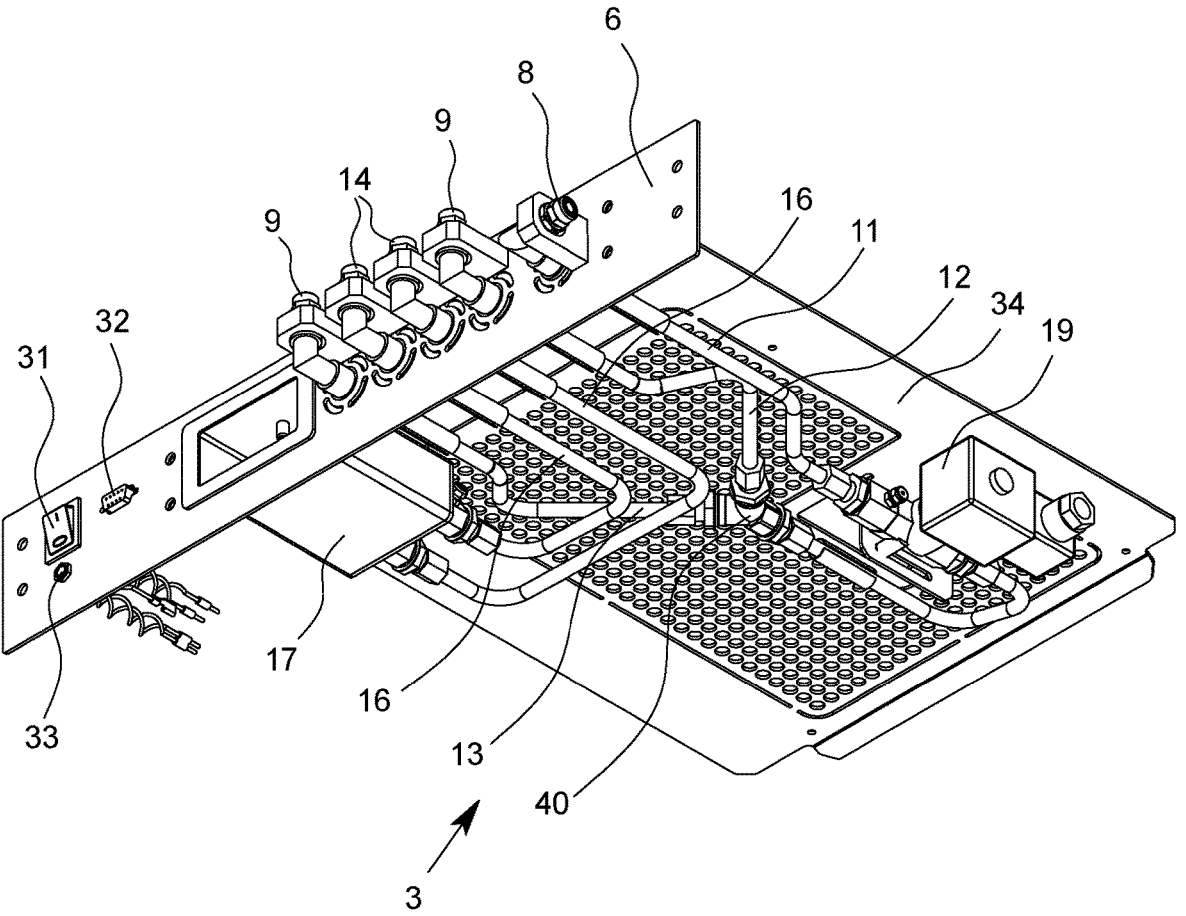
FIG. 5 is the functional part shown in FIG. 4 in a perspective view obliquely from below.
Figure 6:
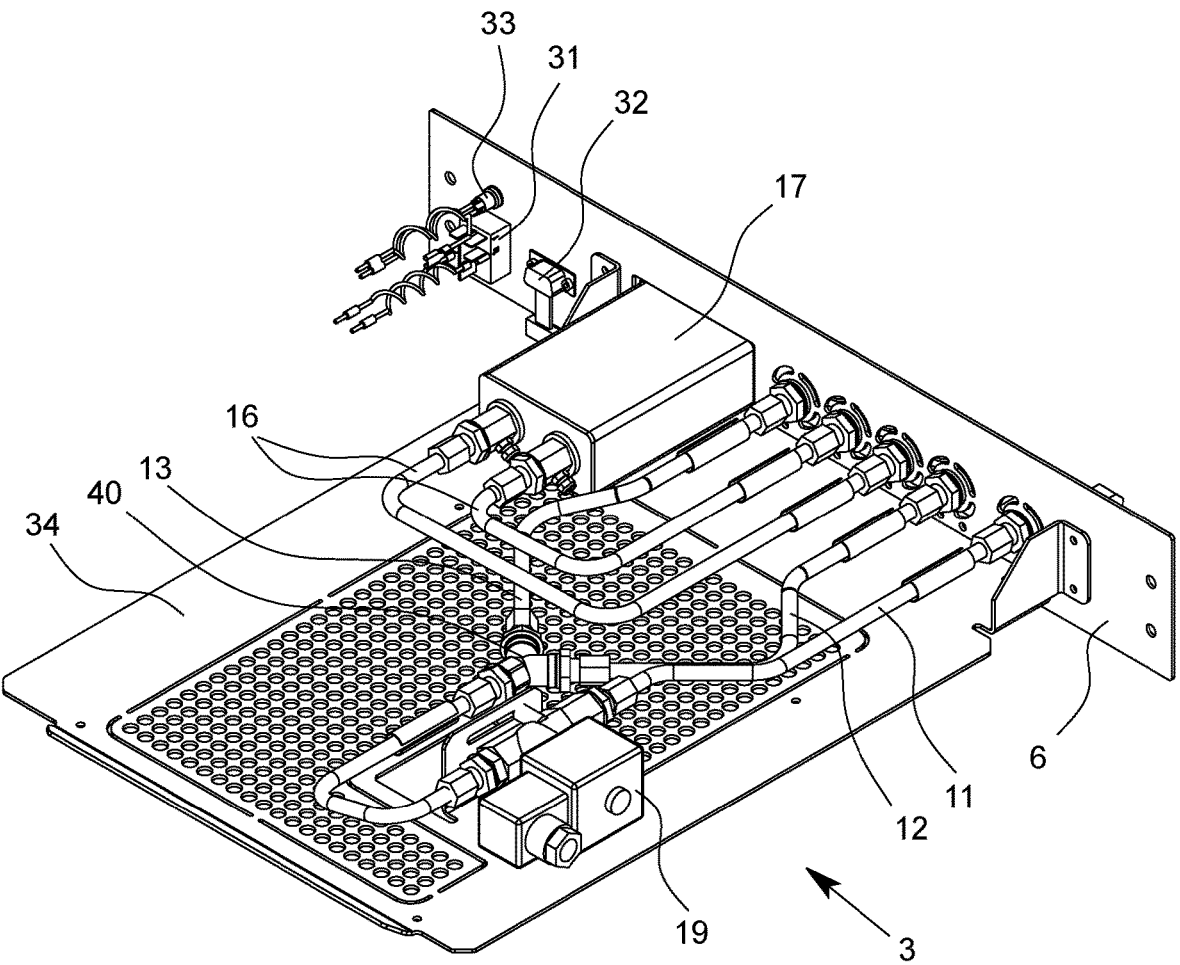
FIG. 6 is the functional part shown in FIG. 4 in a perspective view from below, looking at the inside of a panel of the functional part.

The device module 1 has a functional part 3 shown in FIGS. 4 to 6, which is installed in a module housing 5 of the device module 1 via the rear side 4 (FIG. 2) of the device module 1. For fastening the functional part 3 to the module housing 5, the functional part 3 has a panel 6 which is screwed to the module housing 5 via knurled nuts 7 on the rear side 4 of the device module 1.

Figure 8:
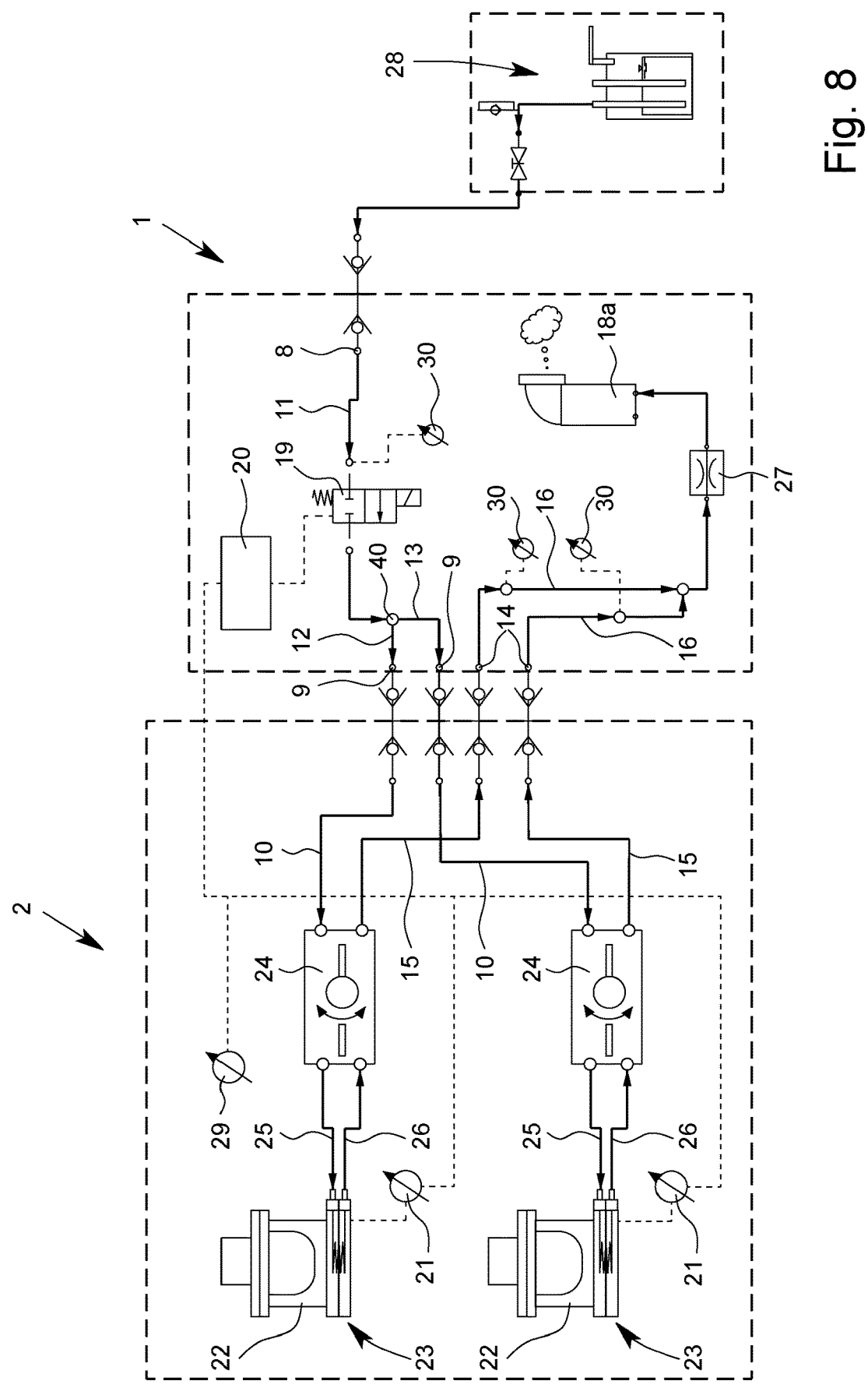
FIG. 8 is a schematic process flow diagram of a process according to the invention for tempering grinding bowls in a laboratory mill.

As can be seen in particular from FIGS. 2 and 5, the functional part 3 in the embodiment example shown has a temperature control medium connection 8 for connecting the device module 1 to a temperature control medium supply 28 shown schematically in FIG. 8. The temperature control medium supply 28 can be a pressure vessel with liquid nitrogen. The connection can be made using hose connectors, check valves and hose sections known per se from the prior art and preferably standardized.

In addition, two line connections 9 are provided on the functional part 3 in the shown embodiment for connection to two supply lines 10 (shown schematically in FIG. 7) of the laboratory device 2 as required. With the line connections 9, it is possible to supply a temperature control medium, in particular a liquid temperature control medium, from the temperature control medium supply 28 via the temperature control medium connection 8, a flow line 11, which in the embodiment shown passes via a Y-piece 40 into two further flow lines 12, 13, and the line connections 9 to the laboratory device 1 via the supply lines 10. The connection can in turn be made via hose connectors, check valves and hose pieces known per se from the prior art and preferably standardized.

In addition, two further line connections 14 are provided on the functional part 3 for connection to discharge lines 15 of the laboratory device 2 for temperature control medium, so that temperature control medium can be discharged from the laboratory device 2 and supplied to the environment via the further line connections 14 and two return lines 16 of the device module 1. For this purpose, the two return lines 16 open into a collecting chamber 17 with an enlarged cross-sectional area, which is provided to accommodate a connection piece 18 for an exhaust pipe not shown. Liquid nitrogen, which is discharged from the laboratory device 2 via the device module 1, can evaporate into the environment via the exhaust pipe.

As can be seen from FIG. 5, the functional part also has an actuator 19 in the form of a solenoid valve in the embodiment shown. With the actuator 19 it is possible to change the flow of temperature control medium, which is led from the temperature control medium supply 28 via the temperature control medium connection 8 and the first flow line 11. The actuator 19 is part of a control loop for controlling a temperature in the laboratory device 2, in particular a temperature at and/or in a grinding bowl 22 (FIG. 8) of the laboratory device 2. The actuator 19 can be used to change the volume flow of the temperature control medium conveyed into the laboratory device 2 via the device module 1, with the actuator 19 being part of a closed control loop for controlling a temperature in the laboratory device 2. FIG. 8 shows that for this purpose at least one temperature sensor 21 is arranged in the immediate vicinity of a grinding bowl 22 of the laboratory device 2, which enables the temperature of the grinding bowl 22 to be monitored. The temperature sensor 21 may be arranged in a component of a grinding bowl holder and/or in a grinding chamber of the grinding bowl 22, thus permitting temperature monitoring of the grinding bowl 22 and/or temperature monitoring of a grinding sample. The determined temperature is then used as input for a process controller, wherein the measured temperature represents an actual value and wherein an electronic unit 20 with a correspondingly designed electronic circuit in the device module 1 forms the logic of the control loop. The electronic unit 20 determines a control deviation between a temperature measured in the laboratory device and a prede-termined stored setpoint value and generates a control variable for the actuator 19 as a function of the control deviation. The controller and/or the electronic unit 20 cal-culate, on the basis of a transfer function, the control variable which drives the actuator 19, in the present case the solenoid valve, and, as a function of the temperature mea-sured with the temperature sensors 21, a preferably clocked feed or supply of temperature control medium to the labo-ratory device 2 via the further flow lines 12, 13 and the line connections 9.

FIG. 8 schematically shows the process sequence of a method for tempering a laboratory device 2 using the example of a laboratory vibrating mill with two grinding bowls 22. Here, two temperature sensors 21 are provided to measure the temperature at two plate-shaped heat transfer elements 23, each heat transfer element 23 being part of a grinding bowl holder for a grinding bowl 22. In this case, the temperature control medium is supplied to the heat transfer elements 23 of the two grinding bowls 22 via supply lines 10, rotary unions 24 and first temperature control lines 25, and is supplied via further temperature control lines 26 from the heat transfer elements 23 via the rotary unions 24 to discharge lines 15, which are connected to the device module 1 via further line connections 14.

FIG. 8 also shows that the line connections 14 are connected to the return lines 16, via which the temperature control medium returned from the laboratory device 2 is fed to an exhaust pipe 18a, if necessary via a throttle 27. The temperature control medium may be liquid nitrogen from a temperature control medium supply 28, for example a nitro-gen tank, so that vaporization of the nitrogen and transfer of the nitrogen to the environment occurs in the exhaust pipe 18a.

The return lines 16 do not necessarily have to be brought together, but can also be routed separately into the exhaust pipe 18a.

It further follows from FIG. 8 that a further temperature sensor 29 may be provided in the laboratory device 2 to measure the ambient temperature and to take it into account as a disturbance variable in the temperature control.

The device module 1 can also have further temperature sensors 30 to determine the flow temperature of the tem-perature control medium in the flow line 11 and/or the return temperatures of the temperature control medium in the return lines 16. From a comparison of the measured tem-perature values, conclusions can be drawn as to whether there is a loss of leakage of the temperature control medium. The further temperature sensors 30 are used for fault detec-tion. The measured values of the temperature sensors 30 can also be taken into account in the temperature control.

The control has a low control inertia due to the local proximity of the temperature sensors 21 in the laboratory device 2 to the grinding bowls 22, so that a high precision and high speed of the control is achieved. Moreover, the temperatures at and/or in the grinding bowls 22 can be controlled independently of each other.

The device module 1 can be used for a plurality of laboratory devices 2 and enables the regulation of a device temperature inside the laboratory device 2, in this case by the clocked inflow of liquid nitrogen as a temperature control medium. The regulation of the device temperature can also be enabled by a proportionally controlled inflow of liquid nitrogen.

For the control, the temperature of external temperature sensors 21 (FIG. 8) is used as an input variable for a process controller, whereby the device module 1 can be used, for example, to temper individual or also several grinding bowls 22 in a laboratory mill.

The device module 1 also has an on-off switch 31 on its rear side 4 and a data interface 32 for transmitting measure-ment data between the laboratory device 2 and the device module 1, in particular for transmitting temperature mea-surement data. The interface 32 is connected to the elec-tronic unit 20. A power supply is possible via a power supply plug socket 33.

Finally, a status display 41 is provided to indicate the operating status of the device module 2 in color. The status display 41 may be a light guide with an LED underneath.

The device module 1 is connected to the laboratory device 2 via coupling connections shown schematically in FIG. 8 with check valves provided on the unit side and on the module side. A corresponding connection is also provided between the device module 1 and the temperature control medium supply 28.

FIGS. 4 to 6 show the functional part 3 which, together with the module housing 5, forms the device module 1. The functional part 3 comprises the temperature control medium connection 8, the line connections 9, 14, the internal line routing and the actuator 19. The actuator 19 is held on a perforated plate 34, which is firmly connected to the panel 6. After loosening the knurled nuts 7, the perforated plate 34 can be removed from the housing part 5 via the panel 6 together with the components attached to the panel 6 and the perforated plate 34.

In the installed state shown in FIG. 1, the perforated plate 34 of the functional part 3 is located below a recess 35 of a base plate 36 of the module housing 5. Via the recess 35 and the perforated plate 34, condensation water, which is pro-duced in the laboratory device 2 during cooling, can drip down through the device module 1 and reaches a conden-sation drawer 37 (FIG. 3) on the underside of the device module 1, via which condensation water can be drained off. The drawer 37 is slidably held on a lower cover plate 39 of the housing part 5, it being understood that the lower cover plate 39 also has recesses for the passage of condensed water.

Figure 7:
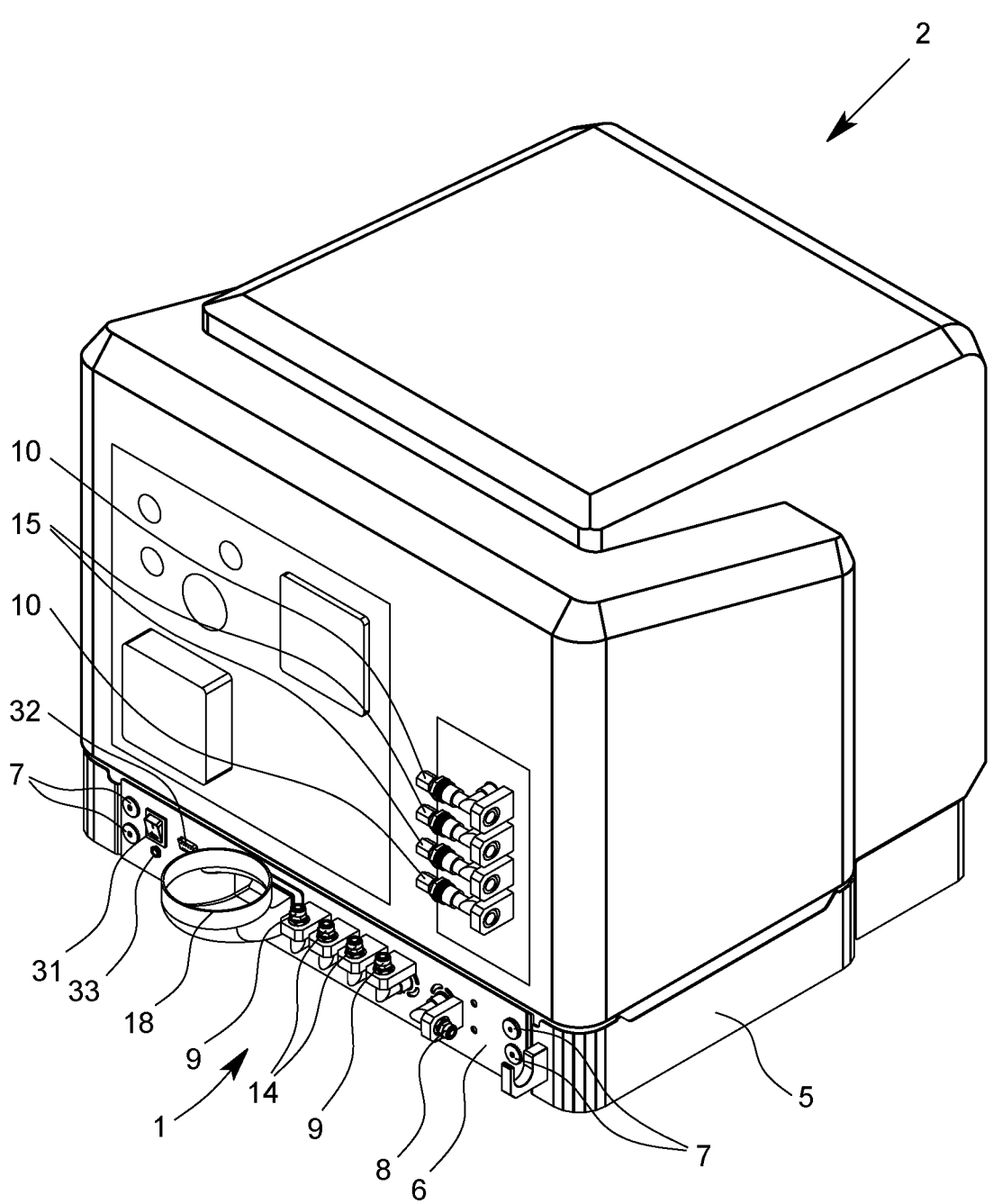
FIG. 7 is a perspective view of a set-up of a laboratory device on the device module shown in FIGS. 1 to 3, viewed obliquely from the rear.

On the upper side, the base plate 36 of the module housing 5 has protrusions 38 to allow the laboratory device 2 to be placed on the device module 1 from above in a certain defined position. In FIG. 7, the condition is shown when the laboratory device 2 is standing on the device module 1 from above.

As can be seen further from FIG. 7, the housing shape of the module housing 5 is adapted to the housing shape of the device housing of the laboratory device 2, so that in the connected state of the arrangement formed by the device module 1 and the laboratory device 2, the device module 1 is perceived as an integral part of the overall housing arrangement. In particular, it is the case that the device module 1 and the laboratory device 2 have, in a view from above, a substantially coinciding contour line with substan-tially aligned side surfaces.

LIST OF REFERENCE SIGNS

1 Device module
2 Laboratory device
3 Functional part
4 Rear side
5 Module housing
6 Panel
7 Nut

8 Temperature control medium connection
9 Line connection
10 Supply line
11 Flow line
12 Flow line
13 Flow line
14 Line connection
15 Discharge line
16 Return line
17 Collecting chamber
18 Connection piece
18a Exhaust pipe
19 Actuator
20 Electronic unit
21 Temperature sensor
22 Grinding bowl
23 Heat transfer element
24 Rotating union
25 Temperature control line
26 Temperature control line
27 Throttle
28 Temperature control medium supply
29 Temperature sensor
30 Temperature sensor
31 On-Off switch
32 Data interface
33 Socket
34 Perforated plate
35 Recess
36 Base plate
37 Drawer
38 Protrusion
39 Cover plate
40 Y piece
41 Status display

The invention claimed is:

1. A device module for a comminution device for material comminution, the device module having:

a device module housing that is detachably connectable to a comminution device housing of the comminution device;

a functional part comprising at least one plate, wherein the functional part further comprises:

at least one temperature control medium connection coupled to the at least one plate, the at least one temperature control medium connection being configured to connect the device module to a temperature control medium supply of a liquid or gaseous temperature control medium;

at least one line connection coupled to the at least one plate, the at least one line connection being configured to connect to at least one temperature control medium supply line of the comminution device to supply the temperature control medium to the comminution device;

at least one flow line providing fluid connection between the at least one temperature control medium connection and the at least one line connection; and at least one actuator of a control process and/or control loop coupled to the at least one plate, the at least one actuator being configured to control and/or regulate at least one temperature in the comminution device by controlling and/or regulating the temperature control medium supplied to the comminution device via the at least one flow line;

wherein the comminution device is configured to be placed on the device module and/or wherein a housing shape of the device module housing is adapted to a housing shape of the comminution device housing;

wherein the at least one plate, the at least one temperature control medium connection, the at least one flow line, and the at least one actuator of the functional part together form an independent functional unit that is configured to be inserted into and removed from the device module housing.

2. The device module according to claim 1, wherein the device module has a control and/or regulating device for generating a control variable for the at least one actuator.

3. The device module according to claim 1, wherein a data interface is provided for transmitting measurement data between the comminution device and the device module.

4. The device module according to claim 1, wherein at least one further line connection is provided for connection to a discharge line of the comminution device for the temperature control medium, wherein the temperature control medium can be discharged from the comminution device via the at least one further line connection and a return line of the device module.

5. The device module according to claim 1, wherein the device module has at least one temperature sensor for detecting a measured value of the temperature control medium.

6. The device module according to claim 1, wherein the functional part can be inserted and/or pushed horizontally into the device module housing of the device module.

7. A system having a plurality of different device module housings, wherein the device module housings are adapted to the shape and/or dimensioning and/or external appearance of the comminution device housings of different comminution devices and wherein the functional part can be connected as required to each device module housing to form a device module according to claim 1.

8. A method for temperature control of a comminution device during operation of the comminution device wherein temperature control of the comminution device takes place in a closed control loop using a device module according to claim 1.

9. The device module according to claim 6, wherein the functional part can be inserted and/or pushed horizontally into the device module housing on a rear side of the device module.

10. The device module according to claim 3, wherein the measurement data are temperature measurement data.

11. The device module according to claim 4, further comprising a collecting chamber to which the return line of the device module is connected;

wherein the collecting chamber is configured to be connected to an exhaust pipe via a connection piece;

wherein the temperature control medium is liquid nitrogen, and the exhaust pipe is configured to allow the liquid nitrogen to evaporate into an environment surrounding the device module.

12. The device module according to claim 1, wherein the device module housing of the device module comprises a lower cover plate, a condensation drawer held on the lower cover plate, and a base plate spaced vertically above the lower cover plate and the condensation drawer;

wherein the at least one plate of the functional part comprises a perforated plate; and wherein the perforated plate is located vertically below a recess in the base plate and vertically above the condensation drawer, such that condensation water from the comminution device drips through the perforated plate into the condensation drawer.

13. The device module according to claim 1, wherein the comminution device is a laboratory mill.

14. The device module according to claim 13, wherein the laboratory mill is a ball mill or a vibratory mill.

15. A system comprising:

a comminution device for material comminution, the comminution device having a comminution device housing;

a device module comprising:

a device module housing that is detachably connectable to the comminution device housing; and a functional part comprising at least one plate, wherein the functional part further comprises:

at least one temperature control medium connection coupled to the at least one plate, the at least one temperature control medium connection being configured to connect the device module to a temperature control medium supply of a liquid or gaseous temperature control medium;

at least one line connection coupled to the at least one plate, the at least one line connection being configured to connect to at least one temperature control medium supply line of the comminution device;

at least one flow line providing fluid connection between the at least one temperature control medium connection and the at least one line connection; and at least one actuator of a control process and/or control loop coupled to the at least one plate, the at least one actuator being configured to control and/or regulate at least one temperature in the comminution device by controlling and/or regulating the temperature control medium supplied to the comminution device via the at least one flow line;

wherein the comminution device is configured such that the comminution device can be placed on the device module and/or such that a housing shape of the device module housing is adapted to a housing shape of the comminution device housing; and wherein the at least one plate, the at least one temperature control medium connection, the at least one line connection, the at least one flow line, and the at least one actuator of the functional part together form an independent functional unit that is configured to be inserted into and removed from the device module housing.

16. The system of claim 15, wherein the comminution device is a laboratory mill.

17. A device module for a laboratory device, the device module having:

at least one temperature control medium connection for connecting the device module as required to a temperature control medium supply of a liquid or gaseous temperature control medium;

at least one line connection for connecting as required to at least one supply line of the laboratory device for the temperature control medium;

at least one actuator of a control process and/or control loop for controlling and/or regulating at least one temperature in the laboratory device by controlling and/or regulating the temperature control medium supplied to the laboratory device via the at least one line connection; and a functional part which can be detachably connected to a module housing of the device module, the functional part comprising the at least one temperature control medium connection, the at least one line connection, and the at least one actuator;

wherein the functional part further comprises a plate, and wherein the at least one temperature control medium connection, the at least one line connection, and the at least one actuator are attached to the plate;

wherein the laboratory device is a comminution device for material comminution or a feeding device for feeding, dosing, and/or conveying sample materials;

wherein the laboratory device can be placed on the device module and/or wherein a housing shape of the module housing of the device module is adapted to a housing shape of a device housing of the laboratory device;

wherein the module housing of the device module comprises a lower cover plate, a condensation drawer held on the lower cover plate, and a base plate spaced vertically above the lower cover plate and the condensation drawer;

wherein the plate of the functional part is a perforated plate; and wherein the perforated plate is located vertically below a recess in the base plate and vertically above the condensation drawer, such that condensation water from the laboratory device drips through the perforated plate into the condensation drawer.

* * * * *